Patented Aug. 14, 1951

2,564,077

UNITED STATES PATENT OFFICE 2,564,077

ALKENYLATION PROCESS

Wayne A. Proell, Chicago, Ill., assignor to Standard Oil Company, Chicago, Ill., a corporation of Indiana No Drawing. Application December 11, 1948, Serial No. 64,915

5 Claims. (Cl. 260—671)

This invention relates to the catalytic alkenylation of aromatic hydrocarbons with conjugated diolefins.

The alkylation of aromatic compounds with olefins in the catalyzing presence of certain acid condensation agents, especially sulfuric acid, is well known. However, the use of sulfuric acid as the catalyst for condensation of aromatics and diolefins results in extensive polymerization and gum formation and the formation of substantially no alkenyl aromatics, just as also would be expected of all seemingly equivalent strong acid condensation agents, such as the alkanesulfonic acids.

It is an object of the present invention to provide an improved process and a novel catalyst for the reaction whereby substantial yields of especially the mono-alkenylated aromatics can be obtained. It is a further object of the invention to provide an improved process and catalyst whereby a specific alkenylated aromatic can be obtained in substantial yields and the preponderance of selected individual compounds in the product can be governed by alteration of process conditions. Another object of the invention is the provision of a method for preparation of the isomer 1-phenyl 2-butene in a reaction product substantially free of co-isomers or other product from which it is only difficultly separable. The invention has for further objects such other advantages or results as will appear in the specification and claims hereinafter made.

This controlled catalytic alkenylation of aromatic hydrocarbons which is a primary object of the invention essentially employs a particular catalytic material comprising as its active ingredient an alkanesulfonic acid, or mixture thereof, having from one to at most five carbon atoms in its alkyl chain. This novel employment of an alkanesulfonic acid as an alkenylation catalyst provides a substantial yield of specific isomers of aromatic alkenes and avoids the polymerization of the employed conjugated diolefins ordinarily observed and to be expected when strong acid condensation agents are employed. Disadvantages inherent in using expensive catalysts or difficultly recoverable ones, or solid catalysts which must be separated from the reaction products and which previously were necessarily employable with the polyolefins can, therefore, now be avoided.

Briefly stated, therefore, the present invention comprises reacting an aromatic hydrocarbon with a conjugated diolefin in the presence of an alkanesulfonic acid or mixture of alkanesulfonic acids containing predominantly methane, ethane and propane sulfonic acids and substantially no acid having more than five carbon atoms in the alkyl radical. Diolefins particularly suitable in the present reaction include the conjugated diolefins such, for example, as butadiene, isoprene, dimethylbutadiene, cyclopentadiene and 1-methylcyclopentadiene-2,4. The alkylatable aromatic hydrocarbons suitable in the reaction include benzene and alkylatable benzenoid hydrocarbons of the benzene series, polynuclear aromatics, and also aromatics which have been alkylated or alkenylated by, for example, previous condensation with olefinic hydrocarbons. The aromatic hydrocarbons may be those contained in the product of the dehydrogenation or cyclicization of naphthenic hydrocarbons, or like refinery process, and, as such, will be present in some dilution in aliphatic hydrocarbons, and may comprise such polynuclear compounds as, for example, methylnaphthalenes.

It was found that under reaction conditions at least five per cent of alkanesulfonic acids by weight of the reactant aromatic was required to effect reaction and that the effective and practical range is from about 5 to 50 per cent by weight of alkanesulfonic acids of which the range between 5 to 20 per cent by weight is preferred. At higher concentrations beyond the above stated range no increased catalysis of the alkenylation is observed and reaction between alkenyl aromatic and the acid is encountered. In spite of the known tendency of strong acid condensation agents to effect polymerization, the above concentrations of the alkanesulfonic acids, either as chemical individuals or as mixtures of the acids having not more than five carbon atoms per molecule, resulted in substantial production of alkenylated aromatics.

Variation in the temperature conditions of the reaction can also be employed to provide notable variation in product distribution. The entire range of suitable reaction temperatures is from about 0° to 150° C., throughout which range substantial production of the monoalkenylated product is obtained. On the other hand, little polyalkenylation occurs at temperatures higher than about 50° C. and the preferred range of temperatures lies between 0° and 30° C. When employing such lower temperatures, a red oil, readily polymerizable to a higher resin, and constituting the aforesaid polyalkenylation aromatics, is produced. At higher temperatures, that is, at the temperatures between 50° and 150° C., instead of the oil, a hard resinous material is obtained as a residue after separation of the mono-alkenyl aromatic. At the higher temperature there is also an increased tendency to form polyaryl alkanes, as is hereinafter demonstrated in Example 3 in which a substantial quantity of ditolyl butane was produced.

The relative concentration of the reactants influences also the progress of the alkenylation reaction. As will be shown in the specific examples the conjugated diolefins are reacted with a molar excess of aromatic hydrocarbons. Higher ratios of the conjugated diolefins to the aromatic being treated provide higher yields of the mono-alkenyl aromatic. However, polyalkenyls are present in the reaction product even when considerable excess of aromatic is employed. Even though a considerable excess of the aromatic is employed, nevertheless little or no polyaryl alkanes are produced in the presence of such excess particularly at the lower temperatures within the said entire range. In addition, certain polymerization products, particularly of the dialkenyl aromatics, appear in the reaction product, usually incident to excessive heating during distillation-isolation procedures.

When employing a gaseous diolefin, such, for example, as butadiene, the alkenylation reaction is carried out by passing the diolefin into a mixture of the aromatic and the catalyst for a period of from one-half to three hours. The reactants are usually allowed to remain in contact for another period of one-half to three hours to ensure substantial completion of reaction. As a rule, atmospheric or only mildly super-atmospheric pressures are employed. The reaction is rather strongly exothermic and, therefore, the maintenance of low temperatures when such are selected requires cooling of the reaction mixture. Of course, as the described reaction is in liquid phase, the reaction temperature must be above the freezing point of the several reactants. The reaction is ordinarily carried on for several hours during which period the diolefin is constantly fed to the reaction zone. At the conclusion of this period, the reactants are allowed to remain in admixture for several hours until any further reaction is believed complete. Thereafter, the reaction product is washed with a dilute alkaline aqueous solution for separation of catalyst and individual products are separated by fractional distillation or the like.

The following specific examples, which are described for the purpose of illustrating the process of invention, employ a mixed alkanesulfonic acid having substantially the composition and physical properties of the mixture described in detail in "Properties and Uses of Alkanesulfonic Acids," Proell et al., Ind. and Eng. Chem., vol. 40, pp. 1129-1132, June 1948.

*Example 1*

Butadiene was passed into a stirred mixture of 614 grams of benzene and 81 grams of the said mixed alkanesulfonic acid in a cooled vessel at a temperature between 24° and 30° C. until 144 grams of butadiene were absorbed. The rate of addition of butadiene was such that the reaction period was approximately three hours. The mixture was maintained at the said temperature for an additional one and one-half hours, at which time it was concluded that the reaction was completed. The mixture was then warmed with dilute, aqueous caustic solution and a minor amount of butadiene was given off. The product was then washed with the aqueous dilute caustic solution and fractionally distilled. Said fractionation provided 90 cc. of liquid having a boiling point of 57° C. at 6 mm. mercury pressure and an index of refraction of $n_D^{20}$ 1.5104. This liquid was determined by means hereinafter described to be 1-phenyl 2-butene. A distillation residue consisted of a rather thin oil which, upon prolonged heating, polymerized suddenly to a very viscous red oil. The relatively low temperature of the reaction resulted in the aforesaid thin oil comprising a mixture of polybutenyl benzenes, whereas, in contrast to the above, alkylation at 50° to 100° C. yields a very dense tar.

*Example 2*

A mixture containing 615 grams of benzene and 80 grams of the mixed alkanesulfonic acid was reacted with butadiene at temperatures within the range of 70° to 80° C. until 123 grams of butadiene was absorbed. The reaction product was thereafter treated in the manner described in Example 1 and 90 cc. of a liquid fraction was so obtained. This liquid, having an index of refraction $n_D^{20}$ equal to 1.5112 was determined to be 1-phenyl-butene-2.

*Example 3*

A mixture containing 100 cc. of toluene and 25 cc. of 95 per cent of mixed alkanesulfonic acid, being predominantly ethanesulfonic acid and containing also some methane and propanesulfonic acid, was reacted with 35.5 grams of butadiene at temperatures within the range of between 90° and 140° C. The reactant mixture was maintained at a temperature below 126° C. for an additional 30 minutes, after which the product was separated, washed with dilute aqueous caustic solution and thereafter fractionally distilled under a vacuum. A fraction constituting 92 grams of a viscous red oil was obtained. This fraction was additionally vacuum distilled and yielded three lighter fractions, all of which were moderately viscous, yellow oils having boiling points respectively of 35° to 55° C. at 1 to 1.5 mm. mercury, 138° to 147° C. at 1.2 mm., and 148° to 167° C. at 1.2 mm. The residue contained 55 cc. of a very tacky viscous oil. The first mentioned fraction is monobutenyl toluene and the intermediate fractions comprise ditolyl butanes. These intermediate fractions are highly aromatic and very high boiling, having a boiling range of 350° to 400° C. at atmospheric pressure and are useful as plasticizers for vinyl resins.

*Example 4*

Gaseous butadiene was passed into a constantly stirred mixture of 861 grams of technical grade beta-methyl naphthalene and 55.5 grams of 99% ethanesulfonic acid for over an hour at which time the weight of butadiene absorbed equaled 170 grams. The temperature of the reaction mixture was 20° C. at the beginning and during the butadiene addition the reaction temperature gradually increased to a maximum of 28° C. The mixture was allowed to react for an additional three hours, and 157 grams of butadiene was thereby retained. The resulting product was cooled and clarified by settling and treatment with a decolorizing clay. 740 cc. of the product (about 740 grams) was distilled and gave 40% of recovered beta-methyl naphthalene, 30% of monobutenyl methyl naphthalene (colorless oil, $d^{25°}=1.00$), 16% of dibutenyl methyl naphthalene, and 14% of higher boiling material. The liquid product cuts, without further refining, showed the following optical data:

Monobutenyl methyl naphthalenes, $n_D^{20}=1.6055$
Dibutenyl methyl naphthalenes, $n_D^{20}=1.5980$

*Example 5*

A liquid mixture containing 3,023 grams of benzene and 396 grams of mixed alkanesulfonic acids with the same characteristics as the above described were stirred in a cooled three neck flask provided with a stirrer, gas inlet and condenser outlet. Butadiene was passed into the reaction mixture for a period of approximately three hours during which period the reaction temperature was maintained below 30° C. by external cooling. A total of 746 grams of butadiene was absorbed during this reaction period. Butadiene addition was then discontinued and the reaction mixture was maintained below 30° C. for an additional hour to permit completion of the alkenylation reaction. The reaction product was washed with water, separated therefrom, and distilled from the reaction mixture at a temperature not exceeding 100° C. so as to avoid polymerization. The distilled product was then fractionated in a Stedman column. The product was substantially entirely mono- and dibutenyl benzene with only a trace of unidentified material which may be butadiene polymers. That portion of the product constituting a monobutenyl benzene exhibited the following physical properties:

Boiling point—64° C. at 9 mm., 70° C. at 12 mm. Hg
Refraction—$n_D^{20}=1.5115$
Sp. gr. (23°)=0.880
Sp. dispersion=178

The monobutenyl benzene having the above physical properties was further identified by certain characterizing reactions substantially as follows: The product absorbed bromine quantitatively to indicate the presence of the double bond and when dehydrohalogenated yielded a mixture of a monobromo phenyl butene and phenyl butine. The latter was separated by distillation. Standard tests of this compound indicated the absence of primary acetylene structure and, therefore, eliminated the possibility of a 1-phenyl-butene-3 being present. The product was slowly isomerized with a saturated solution of KOH and normal butanol to give 1-phenyl-butene-1, identified by yielding a solid dibromide having a melting point of 69° C. Hydrogenation of the initial product over Raney nickel yielded normal butyl benzene quantitatively and indicated a straight chain structure for the phenyl butene. The preceding and similar tests indicated the structure of the phenyl butene to be 1-phenyl-butene-2.

The remarkable homogeneity of the phenyl butene product in respect of its being solely the isomer 1-phenyl-butene-2 is even further demonstrated by evidence that the product is probably exclusively the trans-isomer thereof. When exposed to ultraviolet irradiation, the product changed refractive index to a higher value and there were also other indications, for example, the unexpected difficulty of isomerizing 1-phenyl-butene-2, which further indicated presence only of the transisomer.

Progressive condensations and numerous additional useful products can be obtained by condensing the alkenylation products of the said disclosed process of invention with additional quantities of aromatic hydrocarbons, in the presence of the described alkanesulfonic acids. Such condensations can be performed either as a separate step or as a continuation in situ of the initial condensation reaction in the presence of provided excess of aromatic compounds.

For example, the polybutenyl benzenes obtained by condensation of benzene with butadiene in the presence of alkanesulfonic acids are condensed with benzene in the presence of a catalytic amount of alkanesulfonic acid and the mixture is heated to 50° to 150° C. for several hours. The product is washed with hot water, settled, and the water and excess aromatic distilled off. The obtained compounds are moderately viscous red oils of a very high boiling point showing high solubility in aromatics, and are especially adaptable for use as plasticizers.

Having thus described my invention, I claim:

1. The alkenylation of a compound selected from the group consisting of the aromatic hydrocarbons of the benzene and naphthalene series with a conjugated diolefin having at most six carbon atoms per molecule comprising reacting the said aromatic with the diolefin for a period of time sufficient to effect substantial reaction at a temperature between 0° and 150° C., and in the presence of about 5 to 50 percent, by weight of the aromatic reactant, of an alkanesulfonic acid having at most five carbon atoms per molecule.

2. The process of claim 1 in which the alkanesulfonic acid catalyst is ethanesulfonic acid.

3. The process of claim 1 in which the reaction period is between about one-half hour and three hours.

4. The alkenylation of an aromatic hydrocarbon of the benzene series with butadiene comprising reacting butadiene with a molar excess of the said aromatic for a period of from one-half to three hours in the presence of between about 5 and 50 percent, by weight of aromatic, of an alkanesulfonic acid having at most five carbon atoms per molecule and at a temperature between 0° and 50° C., separating monobutenylated aromatic hydrocarbon by distillation of the reaction product and recovering a polybutenyl aromatic hydrocarbon from the distillation residue.

5. The preparation of 1-phenyl-butene-2 from butadiene and benzene comprising the steps of flowing butadiene into a molar excess of benzene containing between about 5 and 50 percent, by weight of the benzene, of an alkanesulfonic acid catalyst having at most five carbon atoms per molecule and thereby effecting absorption of butadiene into the said benzene, reacting the benzene and butadiene at a temperature between 0° and 150° C. for a period of about one-half to three hours, separating the reaction products from catalyst, and distilling the said reaction product to obtain therefrom a low boiling fraction comprising substantially only 1-phenyl-butene-2.

WAYNE A. PROELL.

REFERENCES CITED

The following references are of record in the file of this patent:

UNITED STATES PATENTS

| Number | Name | Date |
|---|---|---|
| 2,014,766 | Isham | Sept. 17, 1935 |
| 2,382,260 | Schaad | Aug. 14, 1945 |
| 2,425,572 | Slotterbeck | Aug. 12, 1947 |
| 2,430,661 | Axe | Nov. 11, 1947 |